United States Patent
Parchamazad

(10) Patent No.: US 6,511,521 B1
(45) Date of Patent: Jan. 28, 2003

(54) PURIFIER OF HYDROGEN FROM REFORMER FOR FUEL CELL

(76) Inventor: Iraj Parchamazad, 1589 Bianca St., La Verne, CA (US) 91750

( * ) Notice: Subject to any disclaimer, the term of this patent is extended or adjusted under 35 U.S.C. 154(b) by 0 days.

(21) Appl. No.: 09/552,287

(22) Filed: Apr. 19, 2000

(51) Int. Cl.[7] .................................................. C10K 3/04
(52) U.S. Cl. ........................ 48/128; 48/DIG. 5; 95/55; 95/56; 96/4; 96/8; 96/10
(58) Field of Search .............................. 48/128, DIG. 5; 422/169, 234; 423/220, 246, 650; 95/55, 56; 96/4, 8, 10; 429/17, 19

(56) References Cited

U.S. PATENT DOCUMENTS

| | | | |
|---|---|---|---|
| 2,699,836 A | * | 1/1955 | Barton, Jr. ...................... 96/10 |
| 3,203,086 A | * | 8/1965 | Eyraud et al. ............. 29/527.2 |
| 3,250,080 A | * | 5/1966 | Garvin .......................... 62/624 |
| 3,251,652 A | * | 5/1966 | Pfefferle ...................... 423/656 |
| 3,350,846 A | * | 11/1967 | Makrides et al. .............. 95/56 |
| 3,522,019 A | * | 7/1970 | Buswell et al. ............. 422/190 |
| 3,911,080 A | * | 10/1975 | Mehl et al. .................. 204/234 |
| 6,352,792 B1 | * | 3/2002 | Parchamazad .............. 422/196 |

* cited by examiner

Primary Examiner—Marian C. Knode
Assistant Examiner—Basia Ridley
(74) Attorney, Agent, or Firm—A. M. Fernandez

(57) ABSTRACT

Contaiminated hydrogen gas from a catalytic steam reformer is purified by passing it through a membrane assembly having a metallic membrane sealed between two tubular stainless steel members having perforations (or being formed as screen or mesh) and having an encapsulating chamber around it. Pressure regulating valve means in recycle path of residual gas flowing out of the membrane assembly maintains a constant pressure of contaminated hydrogen gas in the membrane assembly. The purified hydrogen gas may be further purified, if needed, by directing the purified hydrogen gas out of a side tube of the chamber through a second encapsulated membrane assembly that is a replica of the first encapsulated membrane assembly. A directional valve may be selectively set to recycle residual gas out of the first membrane assembly until it is virtually free of hydrogen. Residual gas out of the second membrane assembly approaches being 100% free of hydrogen and may always be exhausted to a burner.

5 Claims, 3 Drawing Sheets

PURIFIER OF HYDROGEN FROM REFORMER FOR FUEL CELL

FIELD OF THE INVENTION

The invention relates to apparatus for removing carbon monoxide carbon dioxide and other impurities from hydrogen produced for a fuel cell by catalytic reforming of hydrocarbon fractions or alcohols.

BACKGROUND OF THE INVENTION

Ongoing research for fuel-cell power generators has undertaken the use of bottled propane, commercially available methanol or other hydrocarbon fractions, such as methane as a source of hydrogen for fueling proton fuel cells. Methane, propane, other hydrocarbons or methanol are suitable for producing hydrogen through a catalytic steam reformer which lends itself to packaging in a system for portable fuel-cell power generation aboard recreational vehicles (RVs) as described in U.S. Pat. No. 6,352,792 titled PORTABLE COGENERATION FUEL-CELL POWER GENERATOR FOR RECREATIONAL VEHICLES filed Mar. 17, 2000, which can also be used for stationary applications.

Such RV power generation systems, and other system applications, utilize hydrogen for proton fuel cells because hydrocarbon fuel or alcohol is readily available as a source of hydrogen. The problem is that, along with a hydrogen-rich gas produced by a reformer, carbon monoxide and other contaminants are produced in the outgoing gas. It is extremely important that hydrogen entering a fuel cell be clean and free of carbon monoxide and other contaminants which can be expected to reduce fuel cell life and efficiency.

Measures have been taken by others to remove carbon monoxide, such as selective oxidation of CO in the presence of hydrogen. Others use a conventional metallic membrane to purify hydrogen, but purification is not 100%, so they also require the use of a methanation catalyst which catalyzes the conversion of CO to methane ($CH_4$). It is not known what effects prolonged exposure to methane will have on fuel cells. It would therefore be preferable to use selective oxidation of CO, but then the presence of $CO_2$ in the hydrogen gas would be increased along with some other concerns. Therefore, it would be preferable to remove virtually all contaminants from the hydrogen gas in the stream from the hydrocarbon or alcohol reformer to the fuel cell by filtration alone.

STATEMENT OF THE INVENTION

In accordance with the present invention, a purifier for hydrogen rich gas from a hydrocarbon or alcohol reformer comprises a semipermeable metallic membrane employed to purify output hydrogen gas before it reaches the fuel cell. The membrane is wrapped around a first tubular support member made from a sheet of metal mesh or screen, or from a perforated section of a tube, and placed within a second tubular support member similarly made but slightly larger, such as by having a slightly larger diameter in the case of a tubular support member, thereby sandwiching the membrane between support members. The support members are preferably made of stainless steel and welded together at their ends to form a seal for the membrane in the assembly such that no gas may pass around the membrane, only hydrogen through the membrane.

The welded membrane assembly is encapsulated in a closed chamber having an input tube at one end for introducing hydrogen rich gas from a source to one end of the encapsulated tubular membrane assembly. The hydrogen is then purified by filtration through the membrane assembly into the outer, sealed chamber. An output tube is located at the other end of the tubular membrane assembly to carry away the gas that does not pass through the membrane. An outside tube connected to a port in the sealed chamber directs the purified hydrogen to fuel cells.

A proportional valve in the output tube maintains constant pressure inside the welded membrane assembly. A directional valve downstream from the proportional valve is provided to recycle contaminated gas from the output tubular member of the chamber back to the input tubular member for further filtering or out to a burner for generating steam for the catalytic reformer that provides the hydrogen-rich gas to the purifier.

The first and second tubular members, and the chamber as well, may be of any geometric cross-sectional shape, such as circular, elliptical, rectangular or some other shape, but a circular shape shown in the drawings is preferable. In any case, the novel features that are considered characteristic of this invention are set forth with particularity in the appended claims.

Should the membrane employed prove not to be 100% efficient, any remaining contaminants in the hydrogen gas from the membrane assembly may be further filtered out in a second membrane assembly like the first, except that it could require its residual contaminated gas output to be always recirculated through a proportional valve because it is virtually free of any hydrogen. The invention will best be understood from the following description when read in connection with the accompanying drawings.

DETAILED DESCRIPTION OF THE INVENTION

Figure 1:
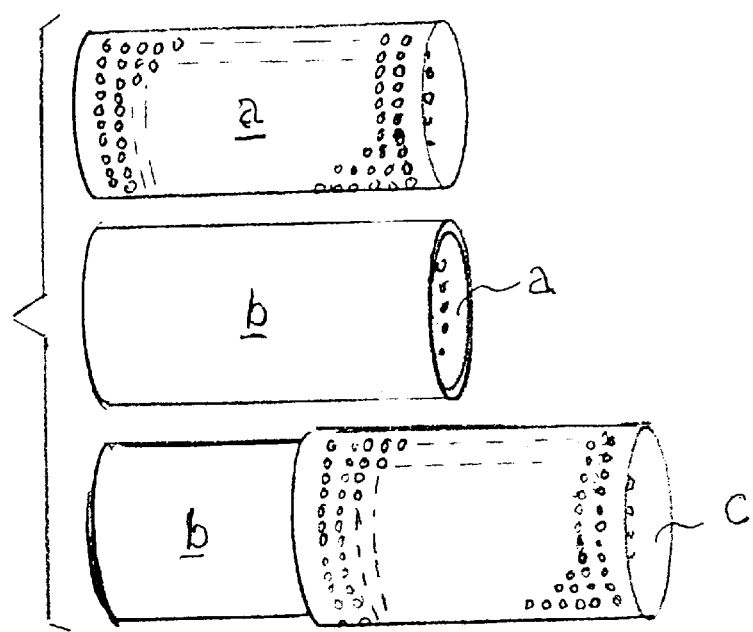
FIG. 1 illustrates (a) first supporting tubular member shown as a perforated tubular member, (b) the first supporting tubular member with a membrane wrapped around the first perforated tubular member, and (c) a second supporting tubular member with the first supporting tubular member and membrane partially inserted into the second supporting member before welding their ends together.

Referring to FIG. 1, a membrane assembly is formed essentially as a tube comprising a first perforated tubular support member a preferably made of stainless steel and a membrane b is wrapped around the first tubular support member a. A second perforated tubular support member c is also made of stainless steel, but of slightly larger diameter than the first tubular support member a for fitting over the membrane b wrapped around the first tubular support member a. The ends of the metallic membrane and the second tubular support member c are welded to the first support member a, thus sealing the membrane so that no gas will pass from inside the support members a to the outside of support member c except through the membrane b.

Figure 2:
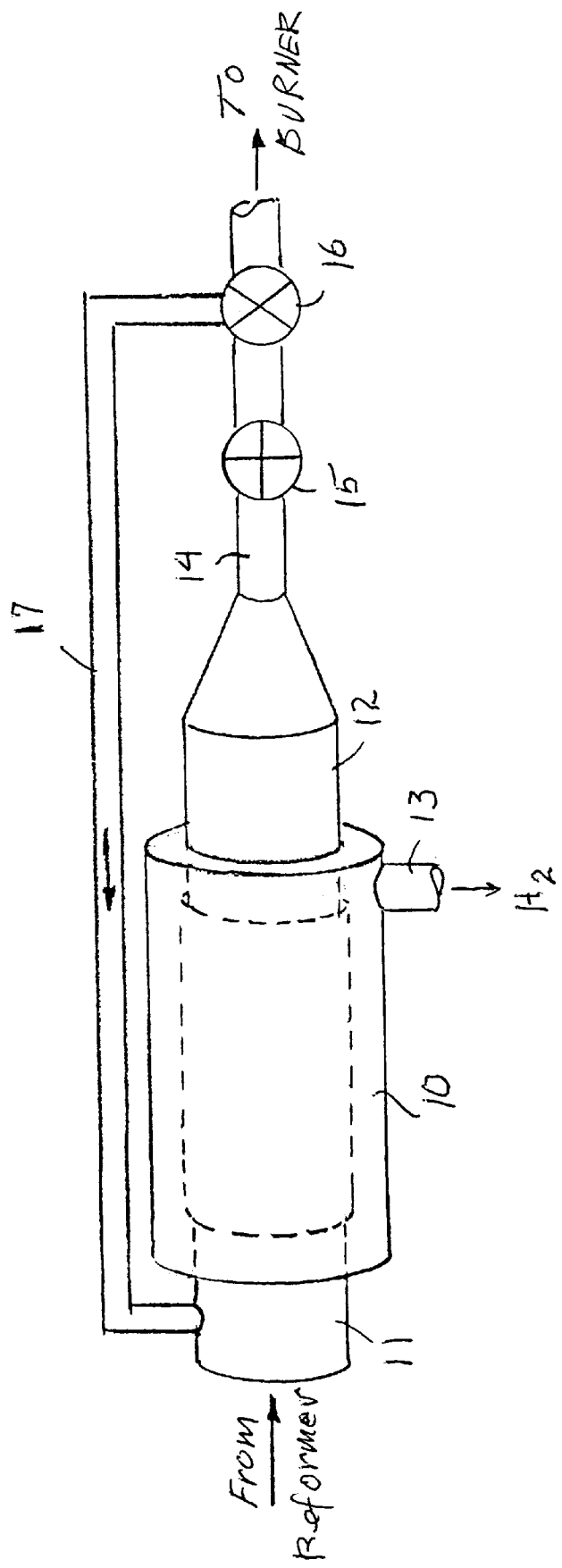
FIG. 2 illustrates schematically the welded membrane assembly of FIG. 1 encapsulated in a chamber having an input tubular member for hydrogen gas from a reformer and an output tubular member for exhaust gas from the membrane assembly, and also an outside tube for connecting filtered hydrogen gas to a fuel-cell power generator.

In practice, the first tubular support member a is made by perforating a section of a tube, leaving unperforated extensions on both ends for incorporation of the membrane assembly into a system as shown in FIG. 2. After wrapping the membrane b around the perforated section of the first tubular support member, the second tubular support member c is made by perforating a tube of slightly larger diameter cut to a slightly greater length than the length of the membrane wrapped section of the first tubular support member a so that it slips over the membrane wrapped around the first tubular support member. The two ends of the second tubular support member c and the membrane b are then welded to the extensions of the first tubular support member a, thus sealing the membrane b between the first and second tubular support members a and c.

The membrane assembly of FIG. 1 is then encapsulated in a chamber 10 having an input tube 11 and an output tube 12 as shown in FIG. 2, which may be extensions of the first tubular member as noted above with reference to FIG. 1. A side tube 13 is connected to a port in the closed chamber to direct the filtered hydrogen gas to a fuel-cell power generator (not shown). This will capture all of the hydrogen coming through the membrane and direct it through the side tube 13 to the fuel cell. The rest of the gas from a reformer or other source continues downstream from the membrane assembly through the output tube 12 and funneled into a smaller diameter tube 14 for compression of the contaminated output gas. A proportional valve 15 in the smaller tube 14 serves to maintain constant pressure inside the membrane assembly.

Downstream from the proportional valve 15 is a directional valve 16 provided to recycle contaminated output gas back through the welded membrane assembly. This valve 16 is empirically set to a position for recycling some or most of the contaminated gas. In practice, initial position is set for full recycling of all the output contaminated gas from the tube 14. Instrumentation may be provided to sense the relative percentage of hydrogen $H_2$ to CO in the contaminated output gas, and when the percentage is lower than a preset value, the valve 16 is switched to stop the recycling through the tube 17. Thereafter, if the relative percentage of $H_2$ to CO is higher than the preset value, the valve is set to recycle the gas mixture again. As long as the relative percentage of $H_2$ to CO stays below the preset value, the valve 16 remains closed to exhaust all of the residual gas to a burner (not shown) for heating the membrane through the wall of the chamber 10, or to some other burner, such as one to produce steam for the reformer.

Figure 3:
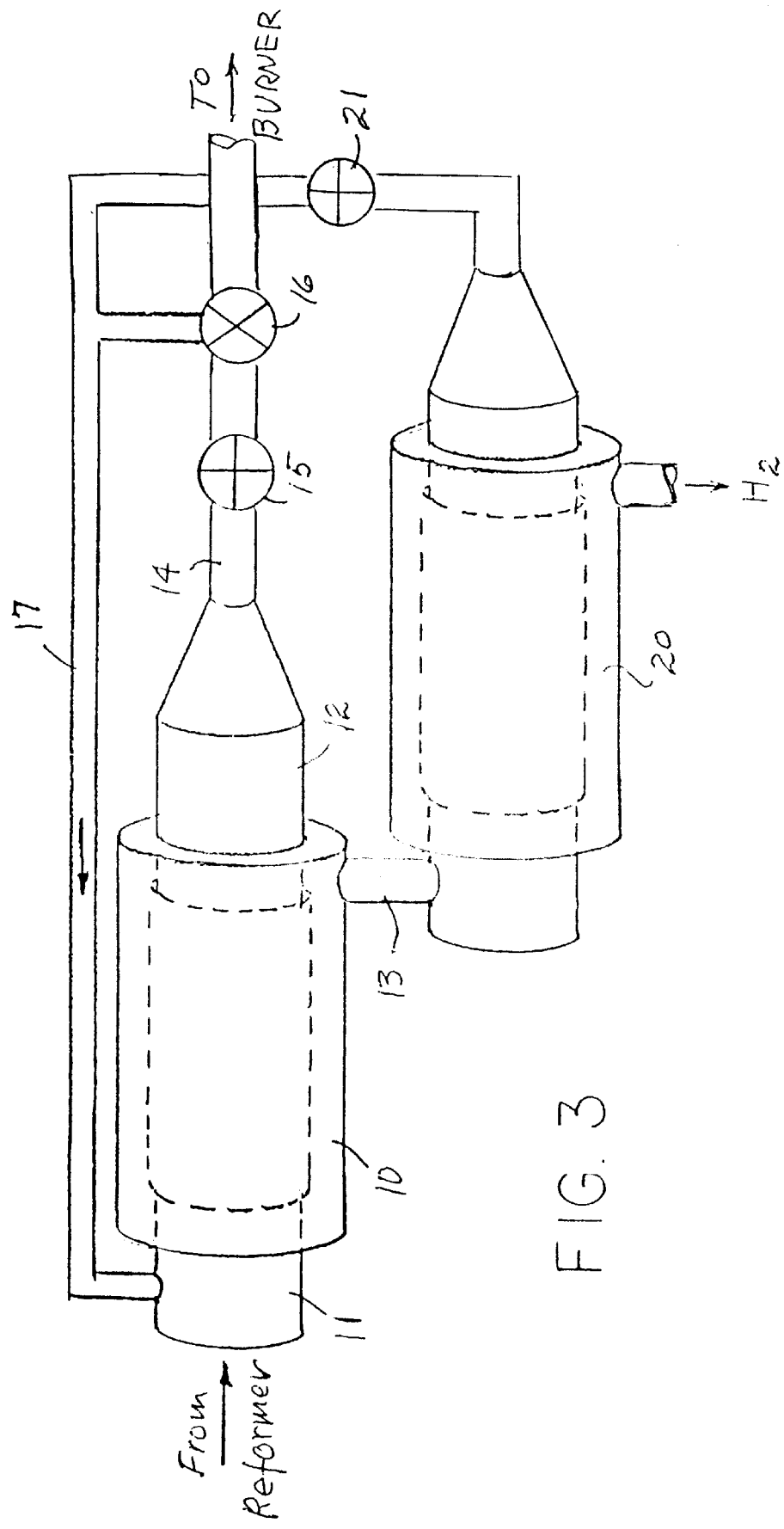
FIG. 3 illustrates schematically the apparatus of FIG. 2 with a second welded membrane assembly and encapsulating chamber for further filtering contaminants from hydrogen gas out of the first welded membrane assembly.

Should the membrane assembly encapsulated in said chamber 10 fail to be 100% efficient in purifying the hydrogen gas out of the tube 13, a second purifier with another membrane assembly, substantially a replica of the first membrane assembly, encapsulated in a chamber 20 can be added as shown in FIG. 3 to receive the hydrogen gas from the side tube 13 out of the chamber 10 for further filtering. The doubly filtered gas out of the second purifier is now a very small amount of hydrogen and may be always exhausted directly to a burner but may also be recycled through a proportional valve 21 as shown in FIG. 3.

This new design, due to gas tight sealing of the membrane in the assembly, does not allow any contaminants into the purified hydrogen in the chamber 20. Although particular embodiments of the invention have been described and illustrated herein, it is recognized that modifications may readily occur to those skilled in the art. Consequently, it is intended that the claims be interpreted to cover such modifications and equivalents thereof.

What is claimed is:

1. Apparatus for removing CO, $CO_2$ and other impurities from a contaminated hydrogen gas produced by a catalytic reformer from hydrocarbon gas, said apparatus using a semipermeable metallic membrane, for separating hydrogen gas from CO, $CO_2$ and other impurities in said contaminated hydrogen gas produced by said catalytic reformer, comprising a first tubular member for supporting said semipermeable metallic membrane, said first tubular member being perforated all around its tubular wall over a defined length, a second tubular member for supporting said semipermeable metallic membrane, said second tubular member being perforated all around its tubular wall over a defined length substantially equal to said defined length of said first tubular member, said metallic membrane being wrapped around said first tubular member overall of said defined length of perforations thereof, said first tubular member with said wrapped metallic membrane being inserted into said second tubular member, wherein perforations of said second tubular member substantially align with perforations of said first tubular member, wherein both ends of the metallic membrane and of the second tubular member are sealed with respective ends of the first tubular member, thereby sealing said metallic membrane between said first and second tubular members to provide a first sealed membrane assembly, wherein hydrogen molecules pass only through the perforations of said first tubular member, said metallic membrane and the perforations of said second tubular member, wherein only hydrogen molecules pass through said membrane and said perforations in said second tubular member, chamber encapsulating said membrane assembly, an input tube for directing said contaminated hydrogen gas produced by said catalytic reformer connected to said first membrane assembly at one end thereof, an output tube connected to said first membrane assembly at the other end thereof or directing residual contaminated gas out of said membrane assembly, and a side tube connected to a port in said chamber for directing purified hydrogen gas out of said chamber.

2. The apparatus as defined in claim 1 having a pressure regulating valve means in said output tube for maintaining gas pressure in said first membrane assembly substantially constant.

3. The apparatus as defined in claim 2 having a recycling tube connecting to said input tube to a directional valve provided in said output tube downstream from said pressure regulating valve means for selectively directing said residual contaminated gas to either said recycling tube or to a burner.

4. The apparatus as defined in claim 1 further having a second membrane assembly encapsulated in a separate chamber with an input tube, output tube and side tube, said second encapsulated membrane assembly being a replica of said first encapsulated membrane assembly, wherein said input tube of said second membrane assembly is connected to said side tube of said first membrane assembly to receive the purified hydrogen gas from said first membrane assembly, thereby further purifying said purified hydrogen gas from said first membrane assembly.

5. The apparatus as defined in claim wherein said output tube of said second membrane assembly comprises a pressure regulating valve means for maintaining gas pressure in said second membrane assembly substantially constant.

* * * * *